United States Patent [19]

McKinney

[11] Patent Number: 5,554,990
[45] Date of Patent: Sep. 10, 1996

[54] AIRSPACE MANAGEMENT SYSTEM AND METHOD

[75] Inventor: Terry L. McKinney, Severn, Md.

[73] Assignee: Northrop Grumman Corporation, Los Angeles, Calif.

[21] Appl. No.: 518,133

[22] Filed: Aug. 22, 1995

[51] Int. Cl.$^6$ ....................................... G01S 13/87
[52] U.S. Cl. .................. 342/36; 342/37; 342/176; 342/181; 342/182
[58] Field of Search .................. 342/13, 29, 30, 342/32, 36, 37, 38, 46, 45, 176, 178, 179, 181, 182

[56] References Cited

U.S. PATENT DOCUMENTS

| | | | |
|---|---|---|---|
| 4,078,317 | 3/1978 | Wheatley et al. | 340/954 X |
| 4,604,711 | 8/1986 | Benn et al. | 364/424.06 |
| 5,012,251 | 4/1991 | Kennedy et al. | 342/176 |
| 5,032,841 | 7/1991 | Shulenberger | 342/37 |
| 5,313,201 | 5/1994 | Austin | 340/961 |
| 5,374,932 | 12/1994 | Wyschogrod et al. | 342/36 |

Primary Examiner—John B. Sotomayor
Attorney, Agent, or Firm—C. O. Edwards

[57] ABSTRACT

An airspace management system and method includes an alternate quick look mode display option which allows a user to designate a specific geographic region for display in a specified area on a display screen. Within this specified area, which can encompass a portion or all of the display screen, radar plot data is displayed for at least one aircraft for which input radar information is received. Symbols can be assigned to aircraft to differentiate friend and enemy aircraft; colors can be assigned to differentiate friend and enemy aircraft and plots; and radar-measured height information can optionally be displayed. In this quick look mode, near real-time positions for all aircraft within the quick look mode window are displayed, since selection of the quick look mode window bypasses normal time-consuming tracking information processing. Thus, a controller can view only essential plot and identification data in an aerial combat situation or to control an aircraft on a landing approach for example, with other portions of the display screen other than the quick look mode window, remaining unaffected. This airspace management system and method thereby combines the most useful attribute of an automated system, namely the automatic tracking of all aircraft, with the most useful attribute of a manual system, namely the near real time display of aircraft locations.

42 Claims, 6 Drawing Sheets

AIRSPACE MANAGEMENT SYSTEM AND METHOD

BACKGROUND OF THE INVENTION

1. Technical Field of the Invention

The present application, in a preferred embodiment, is directed to an airspace management system and method which includes an alternate "quick look" mode (QLM) display. This "quick look" display mode provides a controller of an airspace management system with an opportunity to view radar plots of aircraft in a particular designated area of the display screen. This allows for a display of aircraft within a dogfight for example, or of an aircraft on a landing approach for example, such that a special pathway can be provided for data in the quick look mode to generate a quick radar plot of the aircraft(s), bypassing a normal tracking processing function (which normally must process received input radar information (plots) to generate tracks and/or information other than a radar plot).

2. Description of Related Art

Known airspace management systems and automated air defense systems provided an operator or controller with information about aircraft based upon received radar information which had to be processed before display. The resulting information might have included digital symbology to distinguish a friendly aircraft from an enemy aircraft or foe at a glance via IFF/SIF (Identification Friend or Foe/Selective Identification Feature) mode and code; other identification information; coordinate location information; height information; and weapons guidance recommendations for example. The SIF permitted the controller to selectively display discrete IFF returns or symbols, to differentiate one friendly aircraft from another, in lieu of traditional track data blocks. However, these systems failed to provide the controller with meaningful support during a tactical engagement or "dogfight" for example, and further failed to provide a controller with information that might be particularly useful to control an aircraft on a landing approach, where controllers need immediate trend information on aircraft positions, in three dimensions, relative to glide slope and glide path.

During a period of tactical engagement, the symbology, data blocks, and intercept guidance recommendations that were previously useful now become a hindrance. Such information merely clutters a screen. Thus, much of the information previously indicated must be turned off (deselected) by the controller. The controller, in a tactical engagement situation, requires only the information depicting the precise positions of fighters and targets.

Previously, automated airspace management systems and methods were not able to quickly and precisely display aircraft locations in situations such as a tactical engagement or in the control of an aircraft on an approach to a landing. In such a known system, such as that shown in FIG. 1, radar information was received from a radar sensor 1, for example, and an input data stream 5 was provided to a modem 7 at the airspace management facility 9. Further, an IFF sensor 3, associated with and triggered to provide a reading shortly before or after the radar sensor 1, further optionally contributed information to the input data stream 5 indicating friend or foe information identifying the aircraft. This information was received by modem 7.

After receiving the information in modem 7, an operations computer program (OCP) 11 then processed the data (X) output from the modem 7. As shown in an expanded portion of FIG. 1, the OCP 11 included an IFF and radar height measurement association unit 15; an associated plot unit 17; and a tracker unit 19. These functions or units could have been physically separated in different processors or physically combined in a single processor/work station. Processing of the received radar information will be discussed hereinafter with regard to the flowchart of FIG. 2, with a single target being discussed for the sake of clarity.

The data (X) from the modem 7 was received by the IFF and radar-measured height information association unit 15 in step S1 of FIG. 2 for example. This unit received data bit streams from radar sensor 1 (which may or may not have been multiple radar sensors, each provided at different locations), the data bit streams optionally including IFF (identification friend or foe) data bits and further optionally including radar-measured aircraft altitude information. The IFF and radar height information association unit 15 received IFF, radar height or altitude information, and standard radar-measured bearing and range information of a target from each radar sensor (or latitude/longitude or other coordinate information received from a radar sensor), and associated the IFF information, radar height information and radar-measured information in step S3.

It should be noted that the received information could have included information from different radar sensors at different locations. Since different radar sensors located in different locations could have provided information of varying reliability and precision about a particular aircraft, the different information from each different radar sensor had to be received, compared, and associated to provide the best possible information about a radar-measured aircraft as explained hereafter. Further, it should be noted that IFF or aircraft identifying data typically indicated information such as mode 1, 2, 3A, 3C, or 4 for example.

The IFF, radar height measurement data and radar-measured information (plots) were thus associated in step S5. Again, this could have involved received radar information, such as bearing and range information of a target, from multiple radar sensors at different locations. The associated information from each radar sensor was then separately stored and later correlated in tracker unit 19 or was correlated, prior to tracker unit 19, regarding particular aircraft or targets detected. Associated plots unit 17 represented the associated, correlated plots.

Next, the radar "tracking" processing function was performed in tracker unit 19. Initially, the tracker unit 19 determined a particular correlation or maneuver window size or area to be measured in step S7. For example, a two mile radius was placed around the coordinates corresponding to the initial radar-measured information received. Next, in step S8, a second or next radar-measured information was received. Then, in step S9, the tracker unit 19 determined whether or not the next received radar-measured information coordinates lay within this determined correlation window. If not, the device returned to step S1 from step S9, since it was determined that latest received radar-measured information was from a target other than a moving object (such as ground clutter, weather, etc.). If that latest received radar information was determined to lie within the previous plot's correlation window, then these two received sets or plots of information were determined to correspond to the same target (aircraft). From the two sets or plots of radar information, a target speed and heading was then calculated in step S11, involving a particular azimuth angle with regard to a predetermined origin, and the target location was displayed via symbol. From the distance and angle, a velocity was then determined. This process was then continued, thereby "tracking" the aircraft in these automated air defense systems.

More specifically, tracker unit 19 compared multiple, consecutive scans of received radar data to determine if a radar "hit" or plot belonged to a moving aircraft and, if so, determined the heading and speed of the aircraft. When multiple radar-measured information inputs were received from multiple radar sensors, each at a different location, the tracker unit 19 functioned as previously stated, except when the geographic coverages of the multiple radar sensors overlapped and a single aircraft was seen by two or more radar sensors simultaneously. Then, an additional multi-sensor correlation task was accomplished. This was accomplished either after IFF and radar height measurement association unit 15 or within tracker unit 19. Thus, if multiple radar sensors were sending data and if those radar sensors had areas of overlapping geographic coverage, then plots/tracks were additionally correlated between radar sensors. However, it should be noted that this processing was both time consuming and often imprecise. In other words, since tracking information was calculated from several inputs and via complex algorithms, the resulting information often caused tracks to move erratically on the display. To correct for these variations, additional time consuming "smoothing" operations were necessary to generate predictable tracks that approximated the aircraft's heading and speed.

Optionally, if radar-measured aircraft altitude information was also received, and/or if aircraft identifying data was also received, then this information was obtained, processed and displayed via symbol in step S13. Then, in step S15, a track identity symbol, track number, and other (selectable) alphanumeric data corresponding to the aircraft was generated (21 of FIG. 1), and was then forwarded to a console 13 of a controller and displayed on a display screen 23.

This normal "tracking" processing function provided the operator with tracking information 24 as shown in FIG. 1, information relevant to a particular aircraft which was detected on radar. However, such information was virtually useless in a tactical engagement situation or to control an aircraft on a landing approach. Further, generation of this information through processing in the tracker unit 19 for example, was extremely time consuming. Specifically, steps S7–S13 were particularly time consuming. Thus, display of a particular aircraft was delayed, and thus a real time display (necessary during the aforementioned tactical engagement or landing control situations) was not possible.

SUMMARY OF THE INVENTION

One object of the present invention is to provide an air defense or air traffic controller, during a tactical engagement or landing control situation for example, with rapid, accurate aircraft position information.

A further object of the present invention is to provide a controller with an opportunity to continuously receive rapid, accurate aircraft position information without the need to deselect irrelevant aircraft information and symbology in an automated or semi-automated air defense system.

A still further object of the present invention is to provide a controller with the opportunity to select one or multiple radar sensors for receipt of information and subsequent display.

An even further object of the present invention is to provide a controller with relatively unprocessed radar plot data, optionally including radar-measured height and IFF/SIF aircraft identifying data, for aircraft of interest.

A yet further object of the present invention is to provide a controller with an opportunity to select a specified geographic area from which radar-measured data, optional radar-measured height data, and optional IFF/SIF data can be received and quickly displayed.

A still even further object of the present invention is to present useful information in a graphical manner that can be readily understood at a glance.

Another object of the present invention is to provide radar plot information, with small informational tags on each identified aircraft, within two or three seconds from when the radar measurements were made.

Another further object of the present invention is to provide a variable display area in which radar plot information with small informational tags is provided, with the remaining display area displaying normal "tracking" information.

Yet another object of the present application is to provide a variable geographic location from which radar plot reports and small informational tags on each identified aircraft will be provided within two or three seconds from when the radar measurements are made, with an expanded geographic area providing information based upon a normal tracking function.

These and other objects of the present invention are fulfilled by providing a method, comprising the steps of:
(a) receiving input radar information for at least one aircraft;
(b) selecting an alternate display mode other than a normal display mode;
(c) designating at least a portion of a display screen as an area for display of at least a portion of the received radar information in the selected alternate display mode; and
(d) displaying a radar plot of at least one aircraft for which input radar information is received, in the designated area of the display screen.

These and other objects of the present invention are further fulfilled by providing a method, comprising the steps of:
(a) receiving input radar information for at least one aircraft;
(b) selecting an optional display mode, other than a normal display mode;
(c) designating an area of a display screen for display of at least a portion of the received radar information in the selected optional display mode;
(d) designating a geographic region represented by the area designated in step (c);
(e) displaying a radar plot for at least one aircraft for which input radar information is received, within the designated geographic region of step (d), in the designated area of the display screen;
(f) processing radar tracking information for each aircraft for which input radar information is received, outside the designated geographic region of step (d); and
(g) displaying processed radar tracking information in an area of the display screen other than the designated area of step (c).

These and other objects of the present invention are still further fulfilled by providing an airspace management system comprising:
first means for receiving input radar information for at least one aircraft;

second means for processing radar tracking information from received input radar information;

selection means for selecting at least one of a standard display mode and a quick display mode, the received input radar information passing from the first means to said second means for processing upon selecting the standard display mode, and at least a portion of the received input radar information bypassing said second means upon selecting the quick display mode;

designation means for designating a geographic region, from which input radar information is received, and for designating an area of a display means for display of input radar information from the designated geographic region, upon selecting the quick display mode; and said display means displaying a radar plot, for at least one aircraft for which input radar information from the designated geographic region is received, in the designated area upon selecting the quick display mode, and displaying processed radar tracking information from the second means, for at least one aircraft for which input radar information outside the designated geographic region is received, in a display area other than the designated area.

These and other objects of the present invention are even further fulfilled by providing an article of manufacture for use in a computer, comprising:

first computer readable code means for causing the computer to receive a selection of an alternate display mode, other than a normal display mode;

second computer readable code means for causing the computer to receive a designation, corresponding to at least a portion of a display screen, as an area for display of at least a portion of received radar information for at least one aircraft in the selected alternate display mode; and third computer readable code means for causing the computer to display a radar plot of received radar information of at least one aircraft in the designated area of the display screen.

The "quick look mode" (QLM) window option of the present airspace management system and method provides the controller with rapid, accurate aircraft position information by permitting him to select the best radar sensor for display (if in a multiple radar environment), by showing him relatively unprocessed radar plot data (with optional radar-measured height and IFF/SIF data) on the aircraft of interest, and by presenting it graphically in a way that can be readily understood at a glance.

By utilizing a "windows" type environment on airspace management system consoles or commercial workstations, the QLM window can be made variable in size to occupy all or a portion of a display screen, and can show aircraft radar plots for radar information within a variable geographic area. Thus, time-consuming track processing through a tracker unit can be intentionally bypassed for those high interest aircraft (engaged in a dogfight, in a landing approach, etc.) in a definable geographic area, thus speeding up the display of critically important data on precise aircraft positions. Further, alphanumeric clutter can be automatically removed from a display, radar plots can be provided in near "real-time", and a controller can view only the type of radar data needed for a particular strategic or tactical situation. Still further, this radar plot information can be displayed along with an identifying friend or foe symbol; the plot can be displayed as a series of identifying friend of foe symbols, and/or particular colors can be utilized to clearly, quickly and accurately identify aircraft and their associated radar plots.

These and other objects of the present application will become more readily apparent from the detailed description given hereinafter. However, it should be understood that the preferred embodiments of the invention are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

The present application, in a preferred embodiment, is directed to an airspace management system, ground based, airborne, shipborne, spaceborne or a combination thereof, and method which provides a controller with strategic air battle management support where needed and near "real-time" tactical information where needed, simultaneously. The system permits the controller to alter the known C3 system processing as previously described with regard to FIGS. 1 and 2 so that the controller views the type of radar information needed for a selectable geographic region in a variable (in size) area or portion of the display. This system and method allows the controller to select the surveillance radar sensor most able to provide precision data regarding the aircraft in question (if in a multiple radar environment); transmits that data to his display via a bypass around the system tracker unit for example; and displays this information in color (for example) and in a form that is ideal for air battle, dogfight, and control situations involving aircraft landing approaches, for example.

Figure 3:
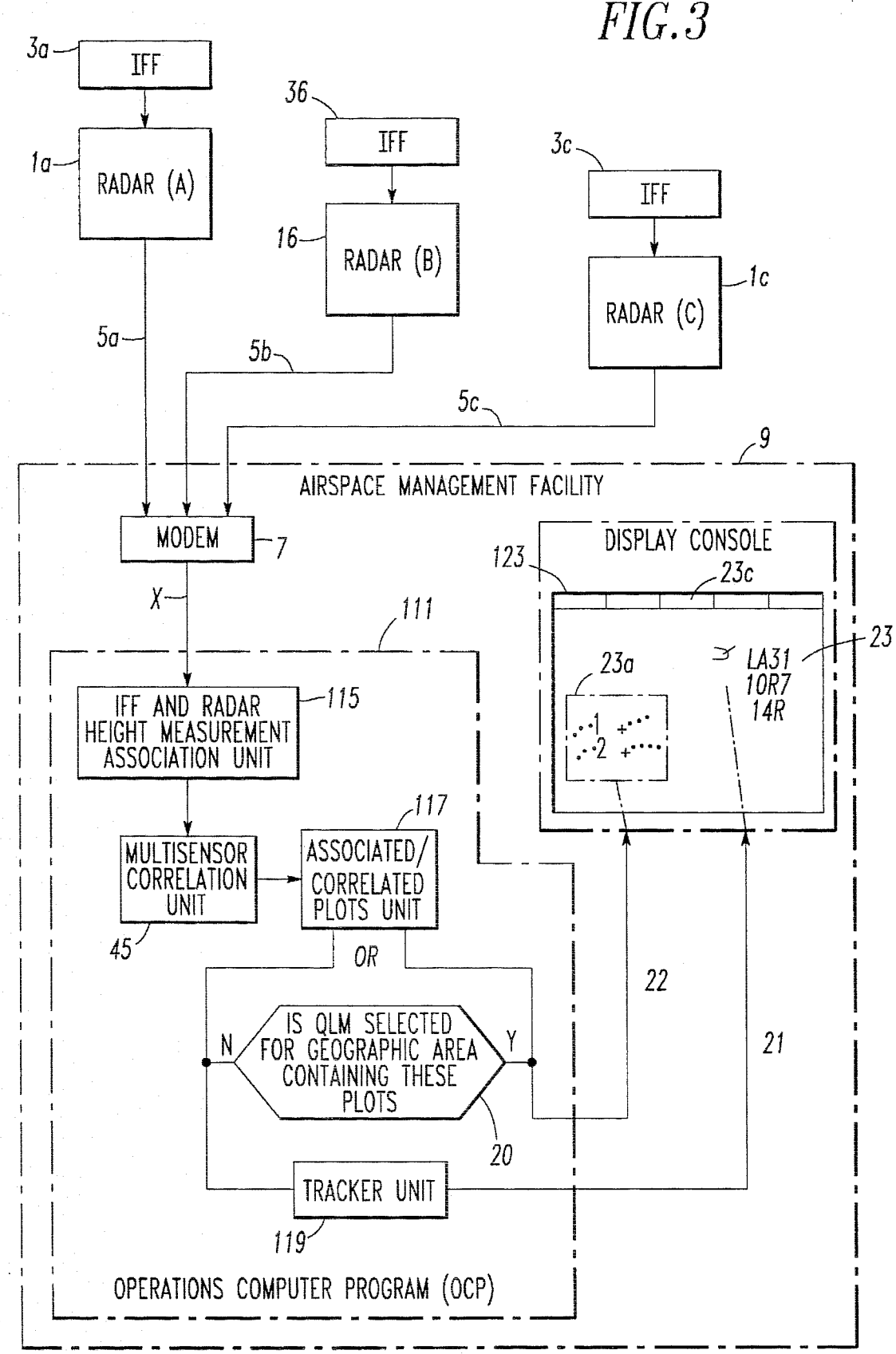
FIG. 3 illustrates an airspace management system including quick look mode (QLM) architecture of a preferred embodiment of the present application.
Figure 3A:
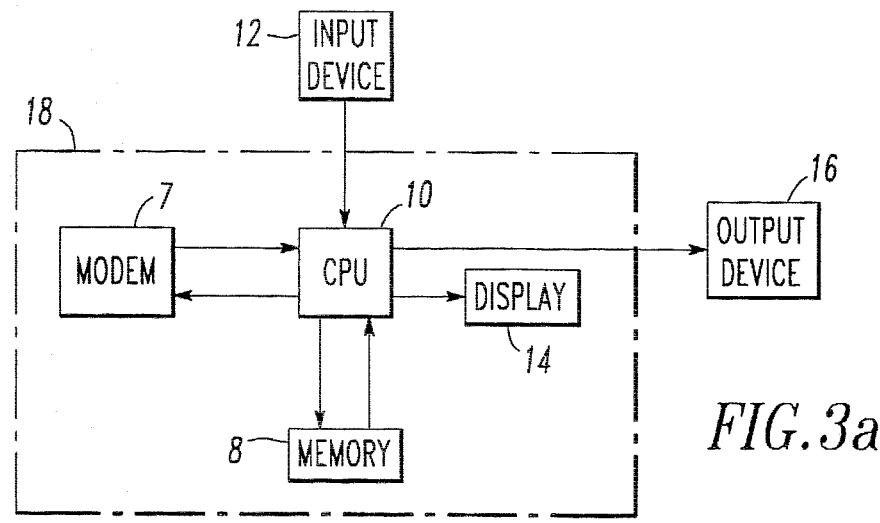
FIG. 3a illustrates alternate computer hardware of the airspace management system.

The aforementioned functions (and functions to be subsequently mentioned) can be linked, for example, in a software module and hosted on a personal computer 18 (such as a Macintosh for example) or on a commercial workstation 18 (SUN, HP, DEC Alpha, for example). Therefore, it should be understood that while a separate modem 7, OCP 111 and console 113 are shown in FIG. 3, a single personal computer or workstation 18 can be utilized to implement the selectable quick look mode aspect of the present application. FIG. 3a illustrates such a personal computer or workstation 18.

Further, as shown in FIG. 3a, such a personal computer includes necessary memory 8 (both RAM and EEPROM memory, for example) for implementing the quick look mode and standard known radar tracking software. Still further, it should be understood that the steps shown in FIG. 5, including the track processing of step S23 (which was more fully described with regard to FIG. 2 of the present application) can be embodied on an article of manufacture such as a computer disk for example or can be stored in a memory 8 or other computer storage medium, the aforementioned computer disk or memory being loaded with the appropriate software to achieve the steps shown in FIGS. 2 and 5 and usable in conjunction with appropriate hardware such as a microprocessor (CPU) 10 and memory 8 of a personal computer 18, in order to implement the software.

As shown in FIG. 3a, such a personal computer or workstation 18 includes a CPU 10, connected to and for receiving data from a modem 7. The CPU 10 is further connected to and can receive data from a separate peripheral input device 12 (such as a mouse or keyboard for example), is additionally connected to and can send/receive data to/from a memory 8; and is connected to and can send data to a display 14 and/or additional peripheral output device 16 (such as a printer or separate display unit for example). Either the display 14 of the personal computer or workstation 18, or a separate peripheral output device 16 can serve as display 123 and can display the results associated with display 123 in both the quick look mode display area 23a and processed tracking data display area 23b.

The basic software of the present application allows a system operator or controller to command the quick look mode (QLM) aspect of the present application. QLM causes radar plot data, input from on-board or off-board radar sensors, such as radar sensors 1a, 1b, and 1c of FIG. 3 for example (and from corresponding optional IFF sensors 3a, 3b and 3c), to be routed around the air defense tracking or other post-processing system (which takes place in a tracker unit 119 of FIG. 3 for example, in a manner similar to that previously described regarding tracker unit 119 of FIGS. 1 and 2 of the present application), for display of radar plots and optional IFF and radar height measurements in near real-time. This mode can be used in instances where operators need faster access to certain radar data and do not require known tracks and symbology, data blocks, velocity vectors or other time consuming processed information.

An example of such a situation occurs where fighters are engaged in a tactical engagement or "dogfight". In this case, the operator needs immediate display of aircraft position information, relative to threats (i.e. enemy aircraft). One QLM scheme of the present application, for example, permits the controller to view small, precise plot positions (using analog or digital radar plots) of all aircraft currently within the radar/air defense coverage volume (or a designatable geographic area) of the system, and above the signal-to-noise detection level.

Figure 4:
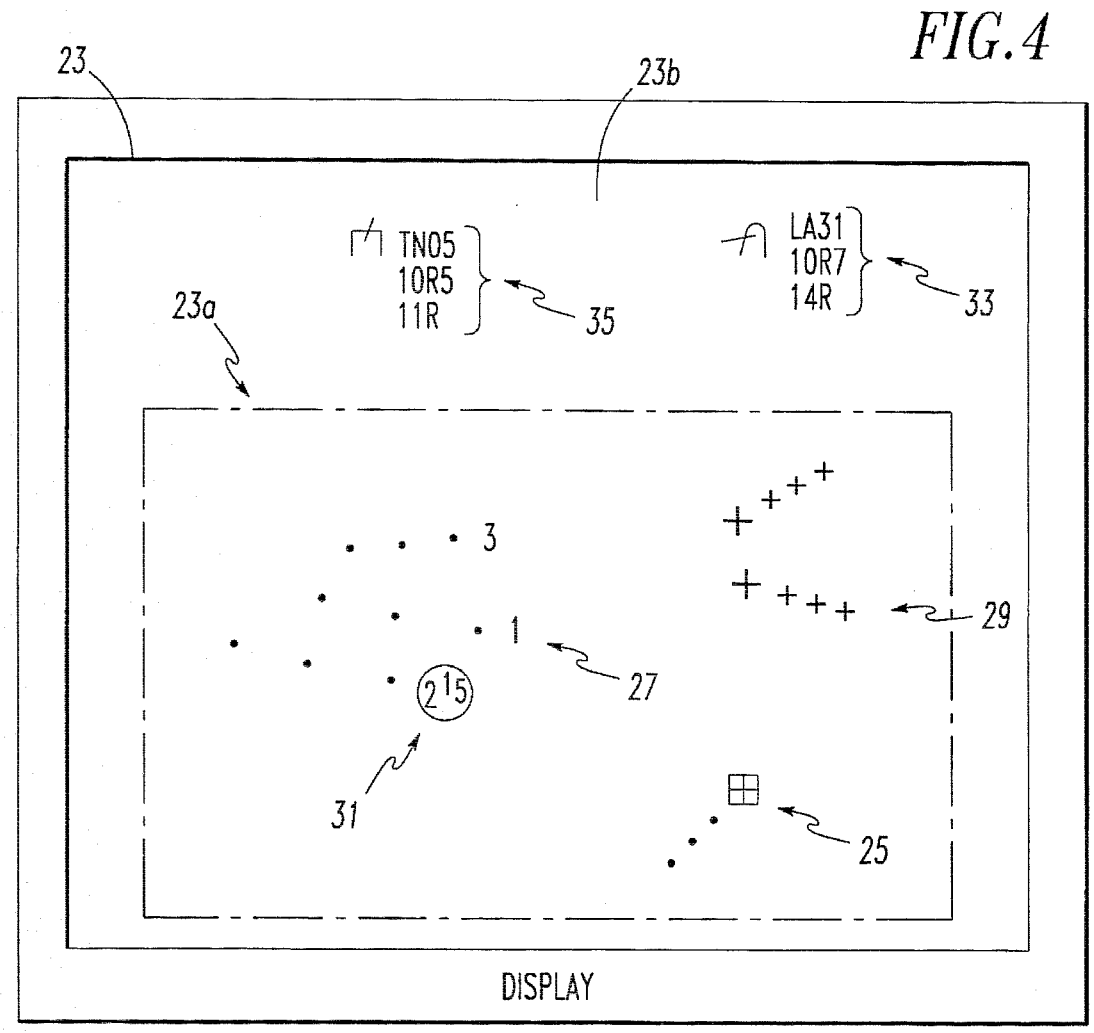
FIG. 4 illustrates an enlarged version of a traditional air defense display console illustrating a quick look mode (QLM) window of the present application.

Pilots of friendly aircraft are discriminated from hostile or unknown aircraft using different shapes, different colors, etc. For example, digital symbols indicating aircraft 1, aircraft 2, etc. (corresponding to relative position) of friendly aircraft 27 of FIG. 4 for example, can be used. Further, as shown with regard to FIG. 4, enemy aircraft 29 (or friendly aircraft 27) can alternately include symbology with regard to the actual plot itself, instead of symbols merely labeling a particular plot. Also, neutral aircraft 25 can be designated by particular symbols as shown in FIG. 4 for example.

If desired, the QLM mode can extract radar detections after their association with IFF responses, if any, and the display processor can then modify the plots displayed to reflect this IFF information using discrete colors, slightly modified symbology, etc. This IFF information can identify the particular aircraft within a formation or airbattle (aircraft number 1 in a flight of four, for example) as shown in FIG. 4 by friendly aircraft 27 corresponding to the number 1.

Radar-measured height information can also be added to the radar plot, prior to routing to the display. This information is normally supplied with the particular input data stream 5a (from radar sensor 1a for example) as shown in FIG. 3 and thus requires no additional association processing. This height information 31 can be viewable when a particular aircraft is further identified, as indicated by the number 15 superscripted above the number "2" of FIG. 4 for example (aircraft number two is flying at fifteen thousand feet altitude). Alternately or simultaneously, a "histogram" or other relational display of aircraft height can be displayed either in a separate window on the situational display or within the QLM display area 23a of FIG. 4 for example.

With regard to FIG. 3 of the present application, FIG. 3 illustrates three separate radar sensors 1a–c which can provide input radar information to an airspace management facility 9. FIG. 3 illustrates a radar sensor 1a, a radar sensor 1b, and a radar sensor 1c. These radar sensors are preferably located in different locations. It should be noted that the use of three radar sensors is merely illustrative. It should be clear that a single radar sensor or a plurality of radar sensors could be used, and thus the number of radar sensors shown in FIG. 3 should not be considered limiting in any way.

Optionally, each of the three radar sensors (for example) can also be associated with an IFF sensor 3a, 3b and 3c of FIG. 3 for example. Each IFF sensor operates in a manner similar to that previously discussed with regard to IFF sensor 3 of FIG. 1, such that when a corresponding radar sensor detects and sends measured radar information, a corresponding IFF sensor also detects and sends identification information, such that an input data stream 5a, being a digital bit stream for example, includes not only bearing and range information of a target from the radar sensor (or a latitude/longitude or other coordinate information), but also includes aircraft identifying data from the corresponding IFF sensor (such as mode 1, 2, 3, or 4 data). The IFF sensor and the forwarded aircraft identifying data is optional, however, and should not be considered limiting.

Figure 6A:
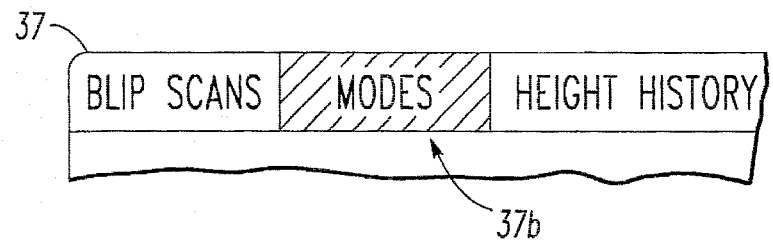
FIGS. 6a–6d illustrate various pulldown menus available in a preferred embodiment of the present application.

Further, radar-measured aircraft altitude data can be supplied with an input bit stream 5a as shown in FIG. 3. It should be noted that this bearing and range data, IFF data, and radar-measured aircraft altitude or height data is data supplied from the radar and IFF sensors 1a and 3a (and optionally from other radar sensors), respectively, to a modem 7 of an airspace management facility 9 directly, with no further processing necessary to produce this data. Thus, this data can be used upon selection of a quick look mode (QLM) option, since this data can be displayed within two to three seconds from when the radar sensor 1a for example actually made the measurements. This provides virtual "real-time" display in the QLM. Similarly, digital bit streams 5b and 5c, optionally including radar-measured altitude and aircraft identifying data, can be provided from each of the other radar sensors 1b and 1c in FIG. 3 of the present application. However, if coverages of multiple radar sensors overlap and if a single aircraft is seen by two or more radar sensors, then an additional multisensor correlation task is accomplished, in a known manner, prior to plot display. This is shown by multisensor correlation unit 45. Further, it should be noted that information from radar and IFF sensors 1a–c and 3a–c, respectively, is normally separately associated (in IFF and radar height measurement association unit 115) and passed through associated/correlated plots unit 117 for separate alternate selection by a controller (see FIG. 6d). Thus, multisensor correlation unit 45 is optional and this separate correlation task is only necessary to provide for selection of an "all plots" option 43a, as shown in FIG. 6d. Further, multisensor correlation unit 45 is preferably bypassed in all instances except where selection of an "all plots" option 43a has been made, to avoid processing time.

The airspace management facility 9 as shown in FIG. 3 includes a modem 7 for receiving the input data streams 5a–c (digital bit streams) from the radar sensors 1a, 1b, and 1c; and OCP 111; and a console 113. As previously stated, a personal computer or workstation 18 can be utilized as the hardware employing the aforementioned modem 7, OCP 111, and console 113 with display 123, this personal computer including a microprocessor (CPU 10) such as a Pentium, 486, etc., and the necessary memory 8 including EEPROM and RAM memory. The software necessary for running the QLM in the windows environment can be provided on a computer disk, CD ROM, tape or other computer readable medium for example, for insertion into such a personal computer or workstation 18, or can be inserted or programmed directly into the memory 8 of the personal computer or workstation 18. For illustrative purposes, the airspace management facility 9 is shown as including a separate modem 7 for receiving input data streams 5a–c from the radar sensors 1a–c for example, with the modem 7 providing the data (X) to the OCP 111, which further provides the data in a selected quick look mode and/or fully processed track mode, to console 113 for display in at least a portion of the display 123 in quick look mode display area 23a.

The OCP 111 is illustrated, in an expanded version, in order to show that it includes an IFF and radar height measurement association unit 115 (section of the program used in association with microprocessor 10) which receives the data (X) from the modem 7 and associates information in a manner similar to that described regarding IFF and radar height measurement association unit 15; associated/correlated plots unit 117 (section of the program); tracker unit 119 (section of the program) which processes radar track information in a manner similar to tracker unit 19 when at least a portion of the received radar information does not bypass tracker unit 119; and QLM selection unit 20, indicating whether or not the quick look mode has been selected for a particular geographic area containing the correlated plots from associated/correlated plots unit 117 for any given display.

If the QLM mode is selected, IFF and radar height measurement data, if optionally provided, from each of the radar sensors and IFF sensors 1a–c and 3a–c are received in 115, the associated/received radar information, height information and IFF information of the radar sensors 1a, 1b and 1c are sent to 117, and the radar plots 22 are then directly supplied to the QLM display area 23a, which includes a variable portion of the display 123. If multiple radar sensors are sending data, if multiple radar sensors are selected (as will be explained later regarding FIG. 6d), and if those selected radar sensors have areas of overlapping geographic coverage, then plots must be correlated between radar sensors and an additional multisensor correlation task can be accomplished in multisensor correlation unit 45. However, in other instances, multisensor correlation unit 45 is bypassed.

Figure 1:
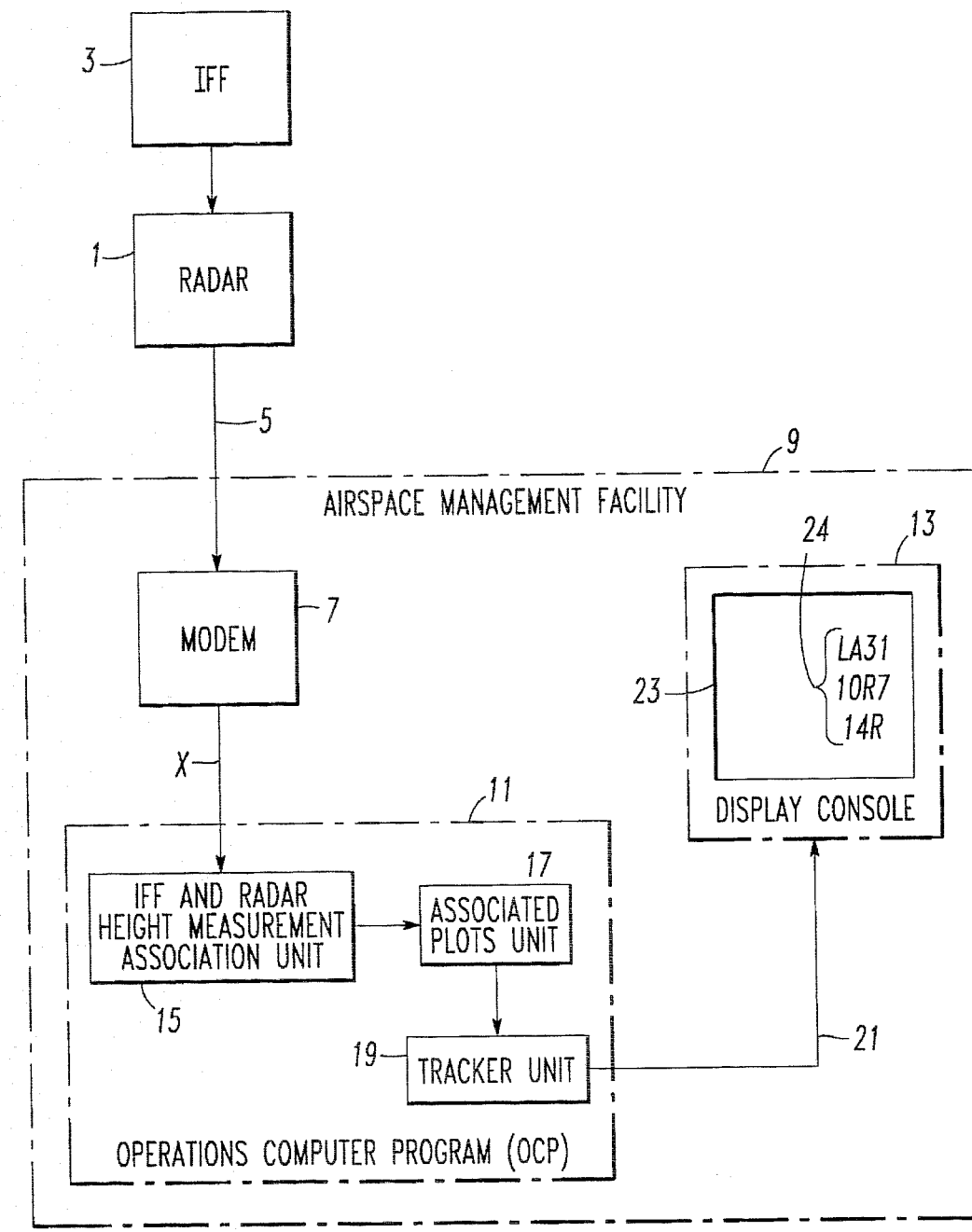
FIG. 1 illustrates a known airspace management system.
Figure 2:
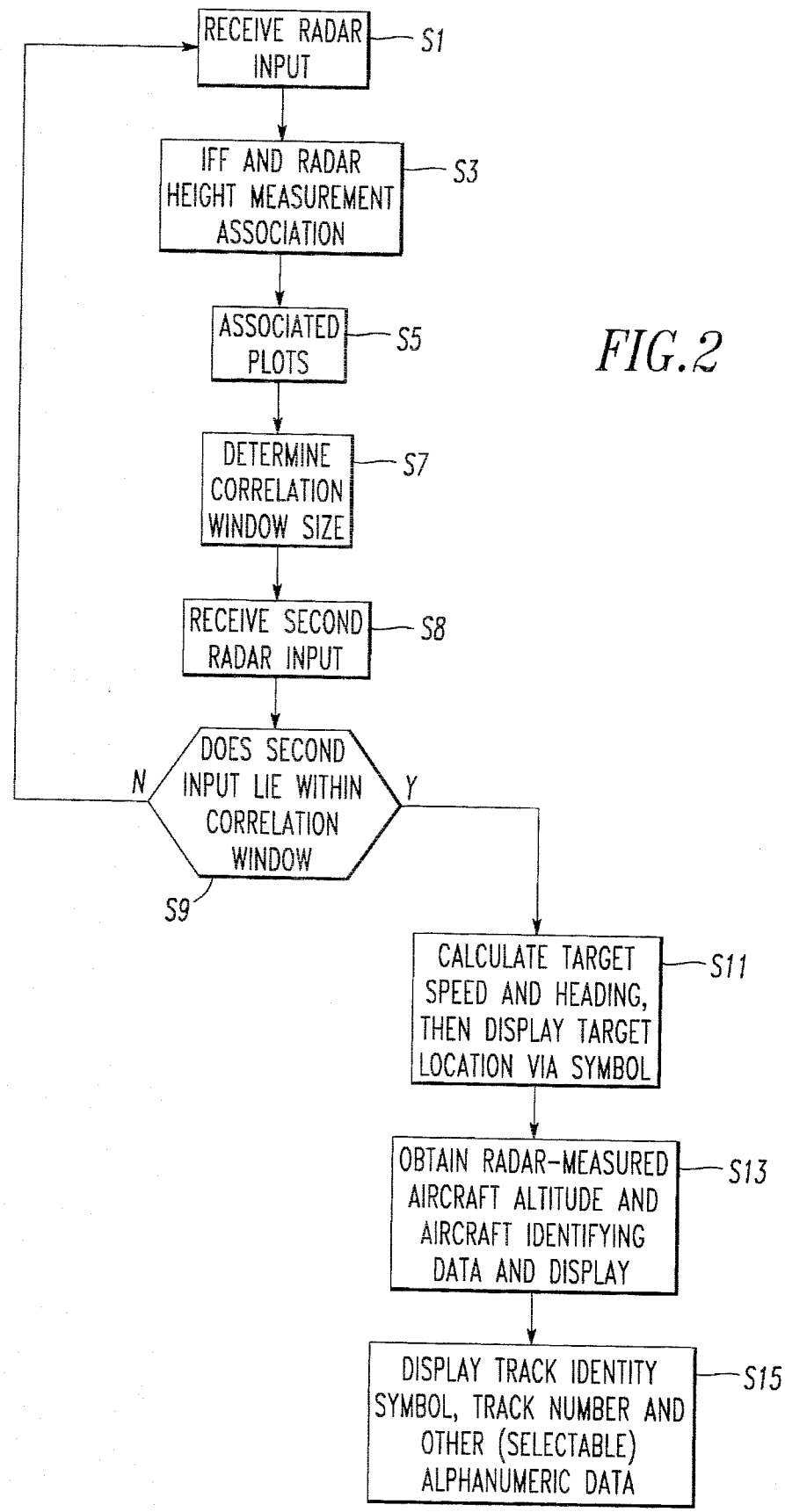
FIG. 2 illustrates a known radar track processing method.

If the QLM mode is not selected, the tracker unit 119 operates in a manner similar to that described with regard to tracker unit 19 of FIG. 1 and with regard to the steps shown in FIG. 2, to provide fully processed tracks 21 to the display 123. Further, if only a portion of the display 123 is selected as the QLM display area 23a, then the remaining portion of the display (processed track information display area 23b) will display fully processed track information 21 from tracker unit 119. The displayed processed track information 24 (from the fully processed track information 21) is generated from input radar information outside the designated geographic area for which the QLM mode is selected. The symbology of displayed processed track information 24 is illustrated in area 23b of display 123. Further, as will be explained later, the display 123 further displays an options bar 37 (of FIG. 6a) in an options bar area 23c, which can be located at the top portion of display 123, for example, which includes various selection bars for selecting particular options such as the QLM, and options within the QLM.

In the quick look mode, a QLM display area 23a is variable in size to encompass a portion or all of the display 123. The implementation of the quick look mode, for example, can be on a display system that utilizes a Windows, X-Windows, or a similar graphics interface unit so that the QLM can be commanded by the operator for either all of the display 123 (and hence all of the geographic area of coverage of the surveillance system) or for only a part of the display 123 (and hence only a portion of the geographic area of coverage of the surveillance system).

One way to command this, in the X-Windows environment, is to designate (hook and drag) a geographic window or box within which the QLM is activated. For all aircraft detected in the geographic window, the special rules of QLM processing (bypassing the tracker unit 119 for example) set a priori in the software of the system, would apply. Outside the QLM geographic window, the display processing system situation display (or normal tracking display mode) is applied.

For example, as shown in processed track display area 23b of FIG. 4, the normal mode of display involves tracking information 33 and 35 including processed tracks and track reports of particular symbology, angle, and height information. Within the QLM display area 23a, a friendly aircraft plot 27 is shown, identified by the symbol 1. This symbol is derived from the IFF/SIF information provided with the received input radar information from modem 7. For example, the numbers 1, 2, 3 etc. indicate relative aircraft and their position information, which can be derived from the radar and SIF data for example. The dots comprising the plot corresponding to the aircraft 1, as shown with regard to friendly aircraft plot 27 of FIG. 4, represent a rippled data trail of the last three plot reports regarding aircraft 1.

Alternatively, or in addition to, a symbol can be assigned to at least one identified aircraft, wherein the assigned symbol is repeatedly displayed as the corresponding radar plot for the aircraft. Thus, as shown in FIG. 4, a particular "plus" (+) or other symbol can be assigned to represent a hostile or enemy aircraft plot 29, and this symbol can be repeatedly displayed so as to correspond to the data trail of subsequent plot reports of the aircraft. Therefore, instead of merely displaying a symbol followed by a trail of dots, a new symbol representing a different type of aircraft (be it friendly, neutral, or hostile) can be displayed as a trail of plot reports. In this example, the "plus" symbol represents a radar return with no associated IFF return.

Additionally, FIG. 4 illustrates a neutral aircraft plot 25, with the neutral aircraft being assigned a neutral aircraft symbol (the "window" symbol shown in FIG. 4 indicates a radar return ("plus" sign) surrounded by a box (friendly IFF response) but is merely illustrative and exemplary and therefore should not be considered in any way limiting), which can be generated from the radar and IFF correlated data. Further, the symbol, plot or both can be displayed in a color representing friendly, neutral, or hostile, or representing different aircraft to further graphically and clearly illustrate different plots and, therefore, different aircraft to a controller or user viewing the display 23. Still further, fully processed track information 33 and 35 of FIG. 4, can optionally be displayed in a different color from information within the QLM display area 23a for example.

An additional option is to display radar-measured height information beside each plot, preferably as a superscripted notation with regard to the assigned symbol identifying the aircraft. The height information 31 of FIG. 4 includes the superscripted number 15 (representing 15,000 feet altitude) being associated with the friendly aircraft symbol "2", with a single target being discussed for the sake of clarity. This radar-measured height information is preferably displayed only when momentarily selected by a controller, and is preferably in a discrete color so as to make it easily recognizable, when momentarily selected. When not momentarily selected, the height information is preferably not displayed, in order to avoid clutter of the display.

Figure 5:
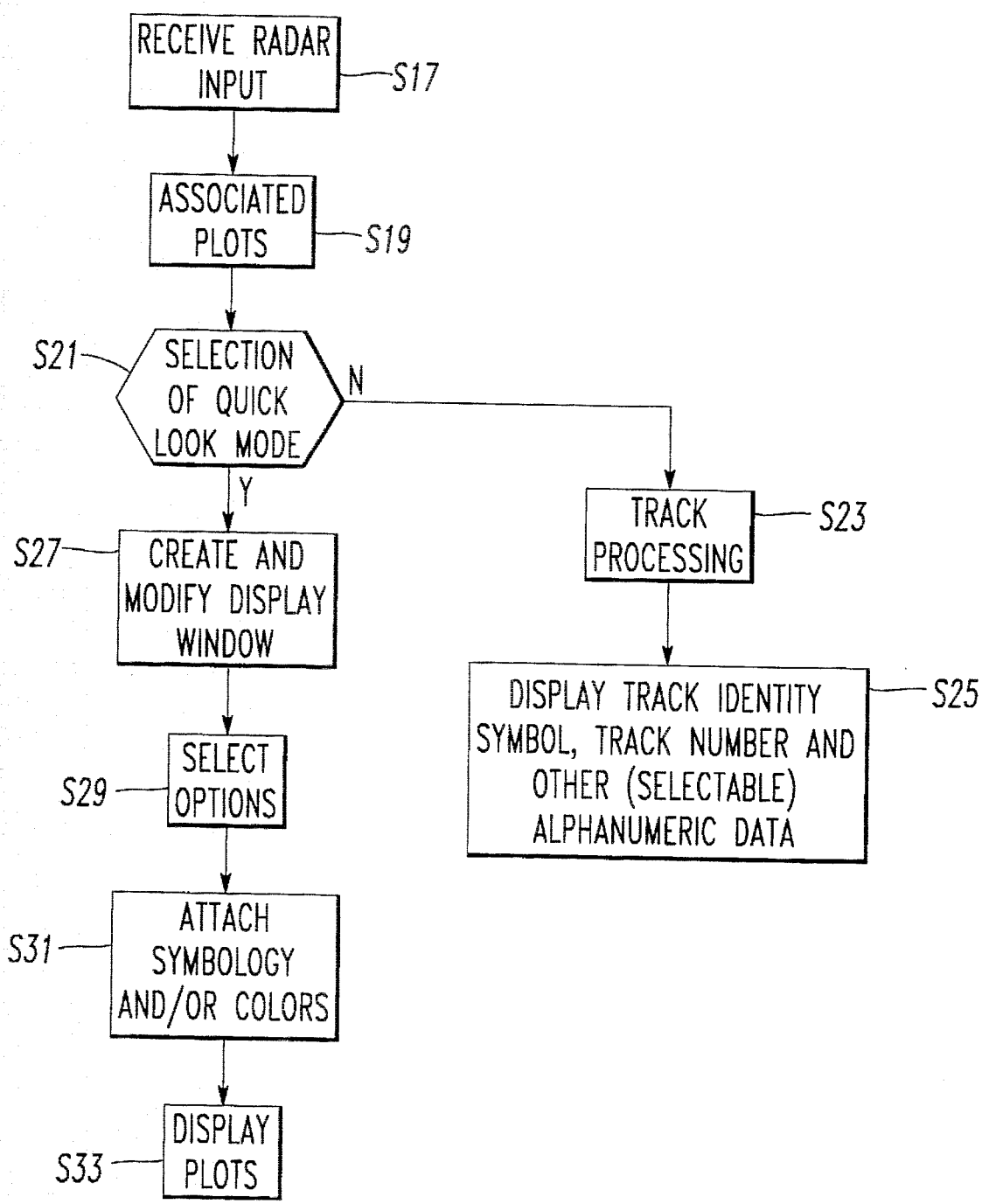
FIG. 5 illustrates a method of generating display data via a preferred embodiment of the present application.

FIG. 5 is a flowchart illustrating the sequence followed by the software of the present application. Initially, radar information is received in step S17, this information corresponding to information from one or more radar sensors 1a, 1b, 1c. Optionally, IFF/SIF information can be included as previously described, as can radar-measured height information. The bit streams 5a, 5b, and 5c from the separate radar sensors 1a, 1b, and 1c are then correlated, if necessary (i.e. if necessary, only if the radar sensors 1a, 1b, and 1c are all sending data, have all been selected, and some have overlapping geographic coverage). Then, in step S19 of FIG. 5, IFF, radar height measurement information (both optional) and radar plot information data are associated for possible output. Next, in step S21, it is determined whether or not the quick look mode has been selected. If the quick look mode has not been selected, then in step S23 track processing takes place in tracker unit 119, in a manner similar to that previously described with regard to steps S7–S15 of FIGS. 1 and 2, and the track identity symbol, track number and other (selectable) alphanumeric data are obtained and displayed in step S25 on the display 123 of FIG. 3.

If the quick look mode is selected in step S21, then the system progresses to step S27. The controller then ball tabs (for example, if a mouse of input device 12 is used, although this should not be considered limiting) to the corner of the desired area of the display 123, then clicks and drags diagonally to cover the area of expected tactical engagement. This serves to designate a portion or all of display area 123 so as to correspond to the quick look mode display area 23a. The particular geographic location applied to the quick look mode can be automatically designated based upon the particular quick look mode display area 23a created. The geographic region to be covered by the quick look mode may further be separately selectable by the user. Release of the clicked button makes the QLM display area 23a appear as a dotted, flashing box (for example), as a portion of the display 123 for example.

Next, options are selected in step S29. These options include height information, IFF/SIF options, or options corresponding to a particular one or ones of radar sensors 1a, 1b, and 1c which will be used to create the display within quick look mode display area 23a. For example, for a system receiving input from multiple radar sensors such as radar sensors 1a, 1b and 1c of FIG. 3 for example, each at different locations, the operator is permitted to select an individual surveillance radar for display of aircraft detections, to the exclusion of detections from other ones of the radars. Alternatively, all radar sensors can be selected. This selection is automated via software as will be explained subsequently with regard to FIG. 6d for example. This selectable radar sensor option features a sequence of operator actions beginning with a visual analysis of discrete radar air picture quality, to determine which of several radars is achieving the highest blip scan ratio which is one measure of quality of radar coverage, then enables an operator to select only the best radar data (from one of radar sensors 1a, 1b or 1c, for example) for display inside the QLM display area 23a. Electronic eavesdropping, or listening or Electronic Support Measures (ESM) information and/or electro-optical information from Forward Looking Infrared (FLIR) and/or information from Infrared Search and Track (IRST) systems can also be input, as available, into the QLM mode.

After the aforementioned options are selected in step S29, symbology and/or color information are selected and attached in step S31. Certain graphic symbols and/or colors are listed for a user's selection, and a user can optionally select whether or not the symbol should be attached to a radar plot (such as neutral aircraft and friendly aircraft plots 25 and 27 of FIG. 4, respectively); or should be used as the radar plot itself (such as enemy aircraft plot 29 of FIG. 4), the aforementioned symbols and colors being separated into groups of symbols and groups of colors representing each of friendly, neutral, and enemy aircraft.

Once friendly/enemy/neutral symbology is selected, it can then be associated with appropriate IFF/SIF information received, and can be automatically displayed. Similarly, it should be clear that friendly/enemy/neutral colors can also be selected, associated, and displayed. Further, it should be noted that the use of the categories of friendly, neutral, and enemy have been used in an exemplary manner in that any categories associatable with received IFF/SIF information can be used and appropriate symbols/colors can be designated, associated, and displayed.

Once the aforementioned options are in place, the plots are then displayed within the QLM display area 23a in step S33 as shown in FIG. 4 for example, including appropriate symbols, colors, etc. The display will utilize radar plots and selected/designated symbols and/or colors, to thereby include only necessary data for a particular tactical encounter or data which is useful in landing an aircraft for example, and will thus avoid unnecessary information of tracking information 33 and 35 of FIG. 4.

Outside the particular geographic area of QLM display area 23a, however, even if the quick look mode is selected, radar tracking correlation will take place in tracker unit 119 in step S23 and symbol, angle and height information will be obtained and displayed as tracking information 33 and 35 in step S25 in the manner previously described with regard to FIGS. 1 and 2. Such tracking information 33 and 35 will be displayed in processed track display area 23b of the display 123, the processed track display area 23b being an area of the display 123 other than the QLM display area 23a.

It should be noted that the information displayed in processed track display area 23b can be set to further correspond to detected information outside of a separate or automatically selectable particular geographic region, the selectable particular geographic region being assigned to correspond to the QLM display area 23a for example.

Further, and optionally, information outside the QLM display area 23a can be deleted from the display 123. Still further, the information in processed track display area 23b can be excluded by expanding the QLM display area 23a so as to cover the entire display 23. Further, if desired by the user, the QLM geographic area can be re-sized to maintain the aircraft of interest in the QLM display region. Alternatively, if desired by the user, the center point of the QLM window can be slaved or tied to the aircraft of primary interest (engaged aircraft, aircraft on approach to landing, etc.), thereby permitting the QLM geographic area and display region to automatically move as the aircraft move. This lessens the need for the operator to constantly resize and relocate the QLM region.

As shown in FIGS. 6a–d, options (for selecting color, symbology, radar sensors, etc.) for selection by a user are preferably provided via pulldown menus. The menu discussion that now follows is only illustrative and is not to be considered limiting. An alternative approach could be keyboard keystrokes, switch actions or other man-machine interfaces, for example.

Initially, an options bar 37 is displayed at a top portion of display 123 in an options bar area 23c, as shown in FIG. 3 for example. An exemplary options bar 37 is shown in FIG. 6a. Once displayed, one of the aforementioned options, such as the "modes" option 37b, is then selected.

Figure 6B:
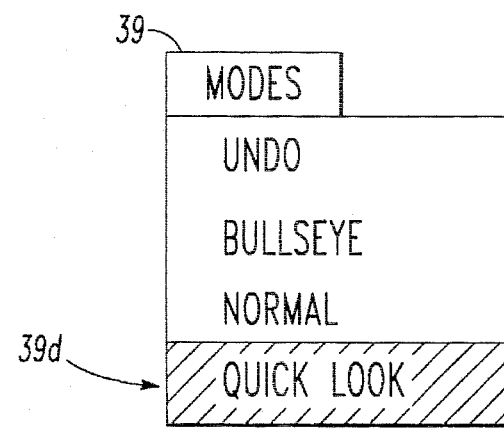

Upon selecting the modes option 37b as shown in FIG. 6a, a modes menu 39 is then displayed, as shown in FIG. 6b. One of the elements within this modes menu 39, namely the quick look mode 39d, is then selected. This allows for the establishment of the quick look mode and is thereafter followed by forming the quick look mode display area 23a and defining a particular geographic area to be shown within the quick look mode display area in a manner similar to that previously described.

Figure 6C:
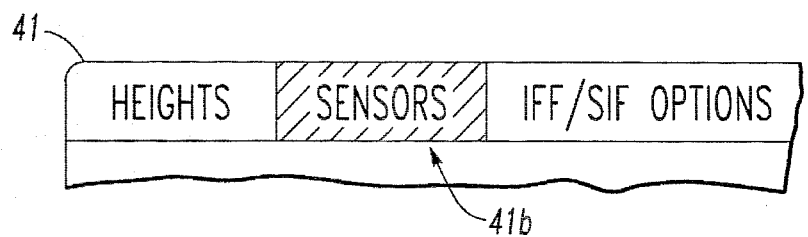
Figure 6D:
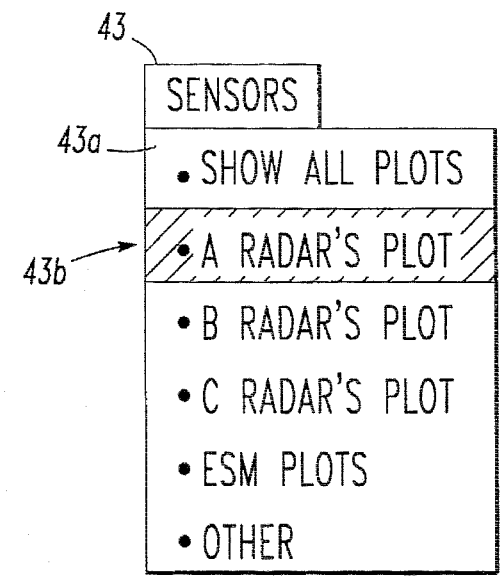

Once the quick look mode display area 23a is formed, an additional options bar 41 as shown in FIG. 6c appears. This allows a controller to select a radar plot display which includes radar-measured height information, IFF/SIF aircraft identification information, information from one or more of a plurality of radar sensors, etc. By selecting the "sensors" option 41b of FIG. 6c, a sensors menu 43 is pulled down, as shown in FIG. 6d. By selecting the all plots option 43a, input radar information for multiple radar sensors is received and the radar plots will be derived from information from all of the multiple radar sensors. If multiple radar sensors are sending data; the "all plots" option is selected; the multiple radar sensors have overlapping geographic coverage; and two or more radar sensors see a single aircraft, then an additional multisensor correlation task is necessary, as previously described.

Alternatively and preferably, a controller selects an individual surveillance radar sensor (1a, 1b or 1c of FIG. 3) for display of aircraft detections, to the exclusion of detections from other radar sensors. The controller can thus separately view plots from each individual surveillance radar sensors (A, then B, then C) and then select the one that provides the best information, to the exclusion of the others. Thus, upon selecting "A" radar plots option 43b in FIG. 6c, only input radar information from a single radar station, radar sensor 1a of FIG. 3 will be utilized for plot display in the QLM display area 23a.

By selecting the QLM mode, the operator may also automatically modify the track "prioritization" and the revisit schedule of the radar system (and hence timeline/ sequencing of modes). This "timeline management" can, via software in the radar sensors, cause the radar sensor, if equipped with an electronically scanned array, to revisit (or scan) high value (QLM) targets more frequently than would otherwise be the case. Selection of the QLM mode raises the priority of all radar plots within the geographically specified QLM area to a very high update status, perhaps just below "unknown" tracks and "hostile" tracks everywhere in the surveillance volume. This will trigger more frequent revisits of this area by the beam of the radar, assuming an ESA is utilized (or with an optimized waveform/pulse repetition frequency (PRF) if a conventional, mechanically-scanned radar is being used). The goal is to achieve the most accurate three-dimensional positional data possible for each aircraft in the QLM area and to display that information as quickly and clearly as possible, even at the slight expense of other radar tasks (such as IFF) in non-critical areas of the surveillance volume.

The QLM system mode is applicable to ground-based, ship-board, airborne and spaceborne surveillance and command control systems, including but not limited to, air defense, air traffic control, airspace management and battle management systems, both single sensor and multiple sensor based.

On any air defense or air traffic control display, the geographic area viewed can be modified by changing the display scale. The QLM mode also resizes its window on the display, relatively and automatically. This thereby provides the controller with a closer look at the actual tactical engagement as the "enemy aircraft" come in closer proximity to the "friendly aircraft".

Regarding optional symbology, which can be attached in step S31 of FIG. 4 within the QLM window, a lead aircraft can be labeled, for example, by the symbol one (1) and the second aircraft can be labeled by two (2). Further, the aircraft such as enemy aircraft can be labeled by utilizing names such as "Bandits", for example.

Alternatively or additionally, a colors option can be selected such that a friendly aircraft is illustrated in a first color, with the enemy aircraft being labeled by a second different color in step S31. Similar to that shown with regard to enemy aircraft plot 29 of FIG. 4, the entire plot of an aircraft can be labeled by a particular symbol, and that plot may further be labeled by a different color to differentiate the enemy aircraft from the friendly aircraft, for example. It should be noted that "aircraft", used throughout the present application, refers generically to any airborne item detectable by radar such as airships, airplanes, helicopters, rockets, missiles, etc., whether identifiable or not.

It should be obvious to those of ordinary skill in the art that the aforementioned system and method may be varied in many ways. For example, defaults can be selected such that when the quick look mode option is selected, if a user does not wish to select any additional options, symbols such as the number one (1) of friendly aircraft plot 27 in FIG. 4 can be used for friendly aircraft, the plus (+) symbols of enemy aircraft plot 29 of FIG. 4 can be used for entire enemy aircraft plots, and the box or "window" symbol of neutral aircraft plot 25 of FIG. 4 can be used to designate neutral aircraft (these being examples only, and thus not limitive). As a default, friendly aircraft can be displayed in one color, enemy aircraft in another color, and neutral aircraft in still a third color. Also, upon selecting a particular size of a window, a portion of a geographic area can be automatically selected, based on the size of the QLM display area 23a in relation to the size of the entire display 123. Radar information for multiple radar sensors can be received, with the option being selectable so that a controller can designate a single radar sensor whose coverage is of primary use in controlling a particular dogfight and whose plots are to be displayed within the QLM display area 23a.

Further, the airspace management system can be configured in a number of ways to better optimize QLM utility. For example, a single centralized post processor (e.g. tracker, digitizer, scan-to-scan correlator such as tracker unit 119) often sends tracks to multiple consoles 113, each console including a display 123. If this single centralized processor or tracker unit 119 is used, when a QLM mode is activated on one console 113, among a plurality of consoles connected to the same centralized processor, the QLM mode activation will create a special pathway for QLM data to the control panel of the controller who selected the QLM mode. The processor will send QLM data on appropriate targets to only that particular console 113. Other consoles connected to the common single centralized processor will be unaffected and will receive processed tracking data.

Alternatively, each console 113 among a plurality of consoles can include its own processor. Thus, a tracker unit 119 and a separate OCP 111 will be connected to each console 113. Again, if a controller at one particular console selects the QLM function, other consoles will be unaffected.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method, comprising the steps of:
   (a) receiving input radar information for at least one aircraft;
   (b) selecting an alternate display mode other than a normal display mode;
   (c) designating at least a portion of a display screen as an area for display of at least a portion of the received radar information in the selected alternate display mode; and
   (d) displaying a radar plot of at least one aircraft for which input radar information is received, in the designated area of the display screen.

2. The method of claim 1, further comprising the steps of:
   (e) receiving aircraft identifying data identifying at least one aircraft with the input radar information of step (a); and
   (f) assigning a symbol to at least one identified aircraft, prior to display in step (d) and based upon corresponding aircraft identifying data received, wherein the assigned symbol is displayed with the corresponding radar plot for at least one aircraft in step (d).

3. The method of claim 2, further comprising the steps of:
   (g) assigning a color to at least one radar plot, prior to display in step (d) and based upon corresponding aircraft identifying data, wherein at least one of the corresponding aircraft identifying data and corresponding radar plot are displayed in the assigned color in step (d).

4. The method of claim 2, further comprising the step of:
   (g) receiving aircraft altitude data identifying the altitude of at least one aircraft, with the input radar information of step (a), wherein the received aircraft altitude data is displayed with the assigned symbol of at least one corresponding radar plot in step (d).

5. The method of claim 1, wherein the designating of step (c) is variable.

6. The method of claim 1, further comprising the steps of:
   (e) receiving aircraft identifying data identifying at least one aircraft, with the input radar information of step (a); and
   (f) assigning a symbol to at least one identified aircraft, prior to display in step (d) and based upon corresponding aircraft identifying data received, wherein the assigned symbol is repeatedly displayed as the corresponding radar plot for at least one aircraft in step (d).

7. The method of claim 6, further comprising the step of:
   (g) receiving aircraft altitude data identifying the altitude of at least one aircraft, with the input radar information of step (a), wherein the received aircraft altitude data is displayed with the assigned symbol of at least one corresponding radar plot in step (d).

8. The method of claim 1, wherein input radar information is received from a plurality of independent radar stations in step (a), each at a different location, the method further comprising the step of:
   (e) selecting at least one of the plurality of independent radar stations, wherein display of step (d) is based upon input radar information from only the selected at least one radar station.

9. The method of claim 8, further comprising the step of:
   (f) correlating input radar information, from each of a plurality of selected radar stations for each at least one same aircraft, upon at least two of the plurality of independent radar stations being selected in step (e), and displaying a radar plot for at least one aircraft in step (d) based upon the correlated input radar information.

10. The method of claim 1, wherein a radar plot is displayed in the designated area of the display screen and radar tracking information is displayed in an area of the display screen other than the designated area.

11. The method of claim 1, further comprising the step of:
    (e) designating a geographic region represented by the designated area of the display screen.

12. The method of claim 11, wherein a size of the geographic region designated in step (e) is variable.

13. The method of claim 2, wherein each assigned symbol of step (f) corresponds to one of a friendly aircraft, an enemy aircraft, and a neutral aircraft.

14. The method of claim 6, wherein each assigned symbol of step (f) corresponds to one of a friendly aircraft, an enemy aircraft, and a neutral aircraft.

15. A method, comprising the steps of:
    (a) receiving input radar information for at least one aircraft;
    (b) selecting an optional display mode, other than a normal display mode;
    (c) designating an area of a display screen for display of at least a portion of the received radar information in the selected optional display mode;
    (d) designating a geographic region represented by the area designated in step (c);
    (e) displaying a radar plot for at least one aircraft for which input radar information is received, within the designated geographic region of step (d), in the designated area of the display screen;
    (f) processing radar tracking information for each aircraft for which input radar information is received, outside the designated geographic region of step (d); and (g) displaying processed radar tracking information in an area of the display screen other than the designated area of step (c).

16. The method of claim 15, further comprising the steps of:

(h) receiving aircraft identifying data identifying at least one aircraft with the input radar information of step (a); and (i) assigning a symbol to at least one identified aircraft, prior to display in step (e) and based upon corresponding aircraft identifying data received, wherein the assigned symbol is displayed with the corresponding radar plot for at least one aircraft in step (e).

17. The method of claim 16, further comprising the steps of:

(j) assigning a color to at least one radar plot, prior to display in step (e) and based upon corresponding aircraft identifying data, wherein at least one of the corresponding aircraft identifying data and corresponding radar plot are displayed in the assigned color in step (e).

18. The method of claim 16, further comprising the step of:

(j) receiving aircraft altitude data identifying the altitude of at least one aircraft, with the input radar information of step (a), wherein the received aircraft altitude data is displayed with the assigned symbol of at least one corresponding radar plot in step (e).

19. The method of claim 15, further comprising the steps of:

(h) receiving aircraft identifying data identifying at least one aircraft, with the input radar information of step (a); and (i) assigning a symbol to at least one identified aircraft, prior to display in step (e) and based upon corresponding aircraft identifying data received, wherein the assigned symbol is repeatedly displayed as the corresponding radar plot for at least one aircraft in step (e).

20. The method of claim 19, further comprising the step of:

(j) receiving aircraft altitude data identifying the altitude of at least one aircraft, with the input radar information of step (a), wherein the received aircraft altitude data is displayed with the assigned symbol of at least one corresponding radar plot in step (e).

21. The method of claim 15, wherein input radar information is received from a plurality of independent radar stations in step (a), each at a different location, the method further comprising the step of:

(h) selecting at least one of the plurality of independent radar stations, wherein display of step (e) is based upon input radar information from only the selected at least one radar station.

22. The method of claim 21, further comprising the step of:

(i) correlating input radar information, from each of a plurality of selected radar stations for each at least one same aircraft, upon at least two of the plurality of independent radar stations being selected in step (h), and displaying a radar plot for at least one aircraft in step (e) based upon the correlated input radar information.

23. The method of claim 16, wherein each assigned symbol of step (i) corresponds to one of a friendly aircraft, an enemy aircraft, and a neutral aircraft.

24. The method of claim 19, wherein each assigned symbol of step (i) corresponds to one of a friendly aircraft, an enemy aircraft, and a neutral aircraft.

25. An airspace management system comprising:

first means for receiving input radar information for at least one aircraft;

second means for processing radar tracking information from received input radar information;

selection means for selecting at least one of a standard display mode and a quick look display mode, the received input radar information passing from the first means to said second means for processing upon selecting the standard display mode, and at least a portion of the received input radar information bypassing said second means upon selecting the quick look display mode;

designation means for designating a geographic region, from which input radar information is received, and for designating an area of a display means for display of input radar information from the designated geographic region, upon selecting the quick display mode; and said display means displaying a radar plot, for at least one aircraft for which input radar information from the designated geographic region is received, in the designated area upon selecting the quick display mode, and displaying processed radar tracking information from the second means, for at least one aircraft for which input radar information outside the designated geographic region is received, in a display area other than the designated area.

26. The system of claim 25, wherein aircraft identifying data, identifying at least one aircraft, is received by the first means with the input radar information, the system further comprising, assignment means for assigning a symbol to at least one identified aircraft based upon corresponding aircraft identifying data received, said display means displaying the assigned symbol with the corresponding radar plot upon selecting the quick mode.

27. The system of claim 26, wherein the assignment means further assigns a color to at least one radar plot based upon corresponding aircraft identifying data, said display means displaying at least one of the corresponding aircraft identifying data and the corresponding radar plot in the assigned color.

28. The system of claim 26, wherein aircraft altitude data, identifying the altitude of at least one aircraft, is received by the first means with the input radar information, said display means displaying the received aircraft altitude data with the assigned symbol of at least one corresponding radar plot.

29. The system of claim 25, wherein aircraft identifying data, identifying at least one aircraft, is received by the first means with the input radar information, the system further comprising, assignment means for assigning a symbol to at least one identified aircraft based upon corresponding aircraft identifying data received, said display means repeatedly displaying the assigned symbol as the corresponding radar plot for at least one aircraft.

30. The system of claim 29, wherein aircraft altitude data, identifying the altitude of at least one aircraft, is received by the first means with the input radar information, said display means displaying the received aircraft altitude data with the assigned symbol of at least one corresponding radar plot.

31. The system of claim 25, wherein input radar information is received from a plurality of independent radar stations, each at a different location, the system further including, radar selecting means for selecting at least one of the plurality of independent radar stations, wherein display by said display means is based upon input radar information from only the selected at least one radar station.

32. The system of claim 31, further comprising:

correlation means for correlating input radar information, from each of a plurality of selected radar stations, for each at least one same aircraft, upon at least two of the plurality of independent radar stations being selected by the radar selecting means, said display means displaying a radar plot for at least one aircraft based upon the correlated input radar information.

33. The system of claim 26, wherein the assignment means assigns one of a friendly aircraft, enemy aircraft, and a neutral aircraft symbol.

34. The system of claim 29, wherein the assignment means assigns one of a friendly aircraft, enemy aircraft, and a neutral aircraft symbol.

35. An article of manufacture for use in a computer, comprising:

first computer readable code means for causing the computer to receive a selection of an alternate display mode, other than a normal display mode;

second computer readable code means for causing the computer to receive a designation, corresponding to at least a portion of a display screen, as an area for display of at least a portion of received radar information for at least one aircraft in the selected alternate display mode; and third computer readable code means for causing the computer to display a radar plot of received radar information of at least one aircraft in the designated area of the display screen.

36. The article of manufacture of claim 35, wherein the computer receives aircraft identifying data identifying at least one aircraft with the received radar information, and the article of manufacture further includes, fourth computer readable code means for causing the computer to assign a symbol to at least one identified aircraft, prior to display caused by the third computer readable code means and based upon corresponding aircraft identifying data received, wherein the third computer readable code means causes the computer to display the assigned symbol with the corresponding radar plot for at least one aircraft.

37. The article of manufacture of claim 36, wherein the fourth computer readable code means causes the computer to assign a color to at least one radar plot, prior to display caused by the third computer readable code means and based upon corresponding aircraft identifying data received, and wherein the third computer readable code means causes the computer to display at least one of the corresponding aircraft identifying data and corresponding radar plot in the assigned color.

38. The article of manufacture of claim 36, wherein the computer receives aircraft altitude data identifying the altitude of at least one aircraft with the received radar information, and wherein the third computer readable code means causes the computer to display the received aircraft altitude data with the assigned symbol of at least one corresponding radar plot.

39. The article of manufacture of claim 35, wherein the computer receives aircraft identifying data identifying at least one aircraft with the received radar information, and the article of manufacture further includes, fourth computer readable code means for causing the computer to assign a symbol to at least one identified aircraft, prior to display caused by the third computer readable code means and based upon corresponding aircraft identifying data received, wherein the third computer readable code means causes the computer to display the assigned symbol as a corresponding radar plot for at least one aircraft.

40. The article of manufacture of claim 35, wherein the computer receives radar information from a plurality of independent radar stations, each at a different location, and the article of manufacture further includes, fourth computer readable code means for causing the computer to receive a radar station selection, corresponding to at least one of the plurality of independent radar stations, wherein the third computer readable code means causes the computer to display a radar plot of radar information of at least one aircraft, received from only the selected radar station, in the designated area of the display screen.

41. The article of manufacture of claim 35, wherein the second computer readable code means causes the computer to receive a second designation, corresponding to a geographic region represented by the designated area of the display screen, and wherein the third computer readable code means causes the computer to display a radar plot of only received radar information within the designated geographic region, of at least one aircraft, in the designated area of the display screen.

42. The article of manufacture of claim 41, wherein the third computer readable code means causes the computer to display processed radar tracking information, for each aircraft for which received radar information is outside the designated geographic region, in an area of the display screen other than the designated area.

* * * * *